(12) United States Patent
Aubert et al.

(10) Patent No.: US 7,907,387 B2
(45) Date of Patent: Mar. 15, 2011

(54) ELECTRODE FOR ENERGY STORAGE SYSTEMS, PRODUCTION METHOD THEREOF AND ENERGY STORAGE SYSTEM COMPRISING SAID ELECTRODE

(75) Inventors: Thierry Aubert, Pau (FR); Patrice Simon, Toulouse (FR); Pierre-Louis Taberna, Roques sur Garonne (FR)

(73) Assignee: Ceca S.A., Colombes (FR)

( * ) Notice: Subject to any disclaimer, the term of this patent is extended or adjusted under 35 U.S.C. 154(b) by 609 days.

(21) Appl. No.: 11/915,199

(22) PCT Filed: May 22, 2006

(86) PCT No.: PCT/FR2006/001157
§ 371 (c)(1),
(2), (4) Date: May 14, 2008

(87) PCT Pub. No.: WO2006/125901
PCT Pub. Date: Nov. 30, 2006

(65) Prior Publication Data
US 2008/0233273 A1     Sep. 25, 2008

(30) Foreign Application Priority Data
May 23, 2005   (FR) .................................... 05 05132

(51) Int. Cl.
*H01G 9/00* (2006.01)

(52) U.S. Cl. ........ 361/502; 361/503; 361/504; 361/512; 361/519; 361/523

(58) Field of Classification Search .................. 361/502, 361/503–504, 508, 509–512, 516–519, 523–525, 361/528–529; 502/426, 432; 252/62.2; 429/306–309
See application file for complete search history.

(56) References Cited

U.S. PATENT DOCUMENTS

| | | | |
|---|---|---|---|
| 5,430,606 A | 7/1995 | Adachi et al. | |
| 5,905,629 A | 5/1999 | Alford | |
| 5,926,361 A * | 7/1999 | Alford | 361/502 |
| 6,064,560 A * | 5/2000 | Hirahara et al. | 361/502 |
| 6,738,252 B2 * | 5/2004 | Okamura et al. | 361/502 |
| 6,865,068 B1 | 3/2005 | Murakami et al. | |
| 7,009,833 B2 * | 3/2006 | Paul et al. | 361/502 |
| 7,391,603 B2 * | 6/2008 | Fujino et al. | 361/502 |
| 7,625,839 B2 * | 12/2009 | Hirahara et al. | 502/432 |
| 2002/0027305 A1 * | 3/2002 | Kibi et al. | 264/29.6 |
| 2002/0048144 A1 * | 4/2002 | Sugo et al. | 361/502 |
| 2002/0114126 A1 | 8/2002 | Hirahara et al. | |
| 2003/0157314 A1 | 8/2003 | Penneau et al. | |
| 2006/0240979 A1 | 10/2006 | Hirahara et al. | |

* cited by examiner

*Primary Examiner* — Nguyen T Ha
(74) *Attorney, Agent, or Firm* — Thomas F. Roland

(57) ABSTRACT

The invention relates to an electrode for energy storage systems, the production method thereof, and an energy storage system comprising said electrode. More specifically, the invention relates to films of carbonaceous active material based on activated carbon with a determined porosity, purity and particle size distribution and a polymer binder, whereby the electrodes comprise one such coating film on a current collector and the supercapacitors comprise at least one of these electrodes. The invention also relates to the method of preparing the aforementioned films, electrodes and supercapacitors.

10 Claims, No Drawings

ELECTRODE FOR ENERGY STORAGE SYSTEMS, PRODUCTION METHOD THEREOF AND ENERGY STORAGE SYSTEM COMPRISING SAID ELECTRODE

This application claims benefit, under U.S.C. §119 or §365 of French Application Number FR 05.05132, filed May 23, 2005; and PCT/FR2006/001157 filed May 22, 2006.

FIELD OF THE INVENTION

One subject of the invention is electrodes intended, in particular, for double layer-type energy storage systems (ultracapacitors). The invention also relates to the process for preparing these electrodes and also to the energy storage systems containing them.

BACKGROUND OF THE INVENTION

Energy storage systems known as "supercapacitors", "ultracapacitors" or "electric double layer capacitors" (EDLCs) are composed of current collectors onto which a film of active material is applied. This system is then immersed in a solvent containing a salt and enables electrical energy to be stored for a subsequent use.

The active materials most used in double layer-type energy storage systems are activated carbons, due to their high specific surface area (generally in the range 500-2500 m$^2$/g) and their relatively low cost. They are differentiated by their origin or precursor (hard coal, lignite, wood, fruit shells, etc.) and also by the type of activation that they have undergone, physical (that is to say with steam) or chemical (phosphoric acid, sodium hydroxide or potassium hydroxide, for example) and/or the type of purification post-treatment which gives them a set of characteristic properties.

The three main properties of the active materials, for example of the activated carbons, which are of interest for this application are the following:
- a) the pore distribution, which determines the accessibility of electrolyte ions at the surface of the active material: the amount of ions accessible at the surface of the carbon determines the capacitance, expressed in farads (F) of the electrode, that is to say its energy density, whereas the mobility of the ions contributes to the surface resistance of the electrode, expressed in ohm.cm$^2$ ($\Omega$.cm$^2$), itself inversely proportional to the power density. The pore distribution of activated carbons is generally described by:
  - the total pore volume, expressed for example in cm$^3$ of nitrogen per gram of activated carbon;
  - the distribution, as a percentage, of this volume as a function of the size of the pores, which are classed as micropores (diameter <2 nm), mesopores (diameter 2-50 nm) or macropores (diameter >50 nm);
  - the specific surface area or BET surface area expressed in m$^2$/g of activated carbon;
- b) the purity: the behaviour of electrodes during ageing is determined, in particular, by the nature and amount of oxido-reducible impurities present in the activated carbon which prove damaging for the electrical properties of the carbon; and
- c) the particle size distribution, which, in particular, influences the use of the carbon during the manufacture of the electrode.

Certain types of activated carbons are known whose porosity makes it possible to obtain, more particularly, high energy densities or high power densities for the ultracapacitors.

In U.S. Pat. No. 5,430,606, activated carbons are described that are obtained by chemical activation using sodium hydroxide and washing with water; the energy storage systems manufactured with these carbons have good initial performances in terms of energy density, but no indication is supplied on their behaviour during ageing. Moreover, the production process described is expensive, as the activation is of chemical type.

U.S. Pat. Nos. 5,905,629, 6,060,424 and 5,926,361 describe ultracapacitors having a high energy density that are obtained from activated carbons having a particular porous structure composed mainly either of micropores (U.S. Pat. No. 5,905,629 and U.S. Pat. No. 6,060,424), or of mesopores (U.S. Pat. No. 5,926,361), but no indication is given on the behaviour during ageing of the electrodes, a fundamental property of ultracapacitors. Moreover, these carbons are obtained by an expensive process consisting of a phosphoric acid chemical activation of the activated carbon precursor followed by washing with water to remove the impurities and an additional heat treatment.

JP 09063907 describes the use in ultracapacitors of an activated carbon obtained by physical activation then washing with water and characterized by a size between 6 and 10 µm and a specific surface area between 1000 and 1500 m$^2$/g. However, no indication is supplied on the impurities present in the final carbon nor on the actual ageing conditions to which the ultracapacitors have been subjected.

As is described in IEEE Spectrum from January 2005, page 29, the large-scale use of ultracapacitors, such as for example in the automotive industry, requires a 5-fold reduction in their cost and an increase in their energy storage capacity: none of the known technical solutions make it possible to obtain ultracapacitors that have, at the same time, energy and power densities that are high and stable over time, at a price compatible with the economic constraints of the automotive market.

SUMMARY OF THE INVENTION

The invention provides ultracapacitors composed of at least one electrode comprising a current collector coated on one or two faces with a film based on at least one activated carbon, denoted throughout the following as AC, which has the following characteristics:
- a) porosity:
  - microporous volume (diameter <2 nm) determined by the DFT method between 0.5 cm$^3$/g and 0.75 cm$^3$/g, preferably between 0.5 cm$^3$/g and 0.65 cm$^3$/g, and representing at least 75 and preferably at least 78% of the total porosity of said carbon;
  - BET specific surface area between 1200 and 1800 m$^2$/g, and preferably between 1200 and 1600 m$^2$/g;
- b) purity:
  - total ash content, determined by the ASTM D2866-83 method less than 1.5% by weight;
  - the weight percentages of the following impurities, determined by mineralization (HNO$_3$/H$_2$O$_2$ treatment) followed by analysis by ICP emission spectrometry or, for chlorides, by extraction with water followed by analysis by ion chromatography, are such that:
    [chlorides]$\leq$80 ppm;
    [chromium]$\leq$20 ppm;
    [copper]$\leq$50 ppm;
    [iron]$\leq$300 ppm;
    [manganese]$\leq$20 ppm;
    [nickel]$\leq$10 ppm; and

[zinc] ≤ 20 ppm;
c) particle size distribution, determined by laser scattering, such that:
   3 µm ≤ $d_{50}$ ≤ 15 µm;
   10 µm ≤ $d_{90}$ ≤ 60 µm;
d) pH, determined by the CEFIC method, between 3.5 and 9, and preferably between 4.5 and 8.

The electrodes according to the invention, of which the film of active material is as defined previously, have the following characteristics, when they are used with an organic electrolyte, such as for example tetraethylammonium tetrafluoroborate ($Et_4NBF_4$) in acetonitrile:

- electrode density or density of the film of active material of the electrode greater than or equal to 0.45 g/cm$^3$, preferably greater than or equal to 0.5 g/cm$^3$;
- initial capacitance per unit volume greater than or equal to 47, preferably greater than or equal to 50 F/cm$^3$, measured at 5 mA/cm$^2$;
- ratio of the capacitance per unit volume after 10 000 cycles, measured at ±5 mA/cm$^2$ between 0 and 2.3 V, to the initial capacitance per unit volume that is greater than or equal to 0.85, preferably greater than or equal to 0.9;
- initial surface resistance of the cell (composed of 2 identical electrodes and a separator), measured at 1 kHz, less than or equal to 1, preferably less than or equal to 0.9, and advantageously less than or equal to 0.85 Ω.cm$^2$; and
- ratio of the surface resistance of the cell after 10 000 cycles to the initial resistance that is less than or equal to 1.5, preferably less than or equal to 1.3.

DETAILED DESCRIPTION OF THE INVENTION

These electrodes are particularly useful for manufacturing double-layer energy storage systems such as ultracapacitors. This is because, relative to the electrodes manufactured with commercial carbons sold for this application, such as YP17 sold by Kuraray or A SUPRA sold by Norit tested in the comparative examples below, the electrodes of the invention have an exceptionally high electrode density, which naturally leads to capacitances per unit volume and therefore to energy densities that are excellent, while retaining very low resistances, therefore high power densities.

Furthermore, the activated carbons having the characteristics indicated above may be prepared from low-cost materials, such as raw materials of plant origin (wood, fruit shells, etc.), by activation methods that are well known to a person skilled in the art and are not very expensive such as physical activation, which makes them particularly attractive from an economic viewpoint.

Another subject of the invention is a process for preparing films of active material based on at least one activated carbon having the characteristics indicated above and also electrodes comprising such a film applied to one or two faces of a current collector.

This preparation process comprises the following steps:

(a) mixing a starting carbon-based pulverulent material comprising at least 80 and up to 97 parts by weight of AC and a solvent, preferably in the proportion of 3 to 50 parts by weight of solvent per 1 part of pulverulent material.

The solvent may be any aqueous or organic solvent such as ethanol.

According to one embodiment, up to 20 parts by weight of the AC or ACs may be replaced by one or more other carbon-based materials, chosen, for example, from activated carbons, acetylene or carbon blacks, or carbon nanotubes. The carbon nanotubes (CNTs) are known and are generally composed of graphite sheets rolled into one sheet (single-walled nanotube SWNT) or into several sheets (multi-walled nanotube MWNT). These 2 types of CNTs are commercially available or can be prepared by known methods. It is also possible to use nanotubes covered with a conductive polymer with a view to improving their faradic behaviour and/or nanotubes doped by a metal oxide.

According to one embodiment, step a) is carried out by ultrasonification for a time, for example, between 5 and 60 minutes.

According to one embodiment, step a) is carried out at a temperature of at least 50° C., for example from 50 to 80° C.

(b) addition of a polymer binder and mixing until homogenization. Thermoplastic polymers or elastomers or mixtures thereof that are soluble in a solvent may, for example, be used as polymer binders. Among these polymers, mention may, in particular, be made of polyethers, such as polyoxyethylene (POE) and polyoxypropylene (POP), polyalcohols such as polyvinyl alcohol (PVA), ethylene/vinyl acetate copolymers (EVA), polytetrafluoroethylene (PTFE), styrene/butadiene copolymers, polyvinylidene fluoride (PVDF), carboxymethyl cellulose (CMC) and polyimide. Advantageously, the binders are used in aqueous suspension or in solution in a solvent.

Preferably, the carbon-based material is mixed with the polymer in a weight ratio of 99/1 to 70/30, preferably of 98/2 to 90/10.

According to one embodiment, the binder is an aqueous suspension of PTFE or styrene/butadiene.

According to one embodiment, the binder is a solution of PVDF or PVDF-HFP (VF2-HFP) copolymer in an organic solvent such as acetone or N-methylpyrrolidone, the solvent possibly also containing ethylene and/or propylene carbonate, which acts as a plasticizer.

(c) partial evaporation of the solvent, at a temperature preferably between 50 and 100° C., to obtain a paste or an ink or a slurry, depending on the consistency desired;

(d) optionally kneading the paste, preferably until a mechanical behaviour suitable for the following forming step is obtained;

(e) forming the paste, ink or slurry into a thin film, for example by coating onto a support.

In order to manufacture the electrode films, the paste, ink or slurry obtained as above in step (c) or (d) are taken and applied to a support, especially by coating. It is advantageous that the coating be carried out on a peelable support, in general having a planar shape, for example using a template. The electrode can also be manufactured directly by coating directly onto the current collector.

(f) drying the film, for example under a rough vacuum at a temperature of at least 80° C. A film is obtained of which the thickness depends, in particular, on the AC/binder ratio and the forming technique: it is generally between a few µm and mm and preferably between 30 and 500 µm.

It would not be outside the invention to prepare AC/polymer binder films by an extrusion process such as described, for example, in WO 98/34977.

(g) covering one or two faces of a current collector with the film obtained in (f).

The current collector may be any electrically conductive material which is non-conductive with respect to ions and is electrochemically stable under the operating conditions of the energy storage system. Satisfactory materials to use for producing these collectors comprise: carbon, unreactive metals and alloys such as aluminium, titanium and stainless steels, electronically conductive polymers, electronically non-conductive polymers filled with a conductive material so as to make the polymer electronically conductive, and similar materials.

According to one advantageous mode, the collectors are aluminium foils, meshes or foams having a thickness between 30 and 200 µm, preferably between 75 and 150 µm.

According to one preferred embodiment of the invention, these collectors undergo the following treatment:
laminating to a thickness between 75 and 150 µm;
mechanical etching; and
surface treatment, for example such as the so-called etching technique or such as the application of a tie sublayer, for example by vaporization of a paint; this paint may, for example, be based on polyurethane and optionally additivated by an acetylene black-type conductor to make it conductive.

The present invention relates to the process for preparing the film of active material based on AC comprising steps (a) to (f) or (a) to (e) of the process explained above and also to the process for manufacturing the electrode containing said film comprising steps (a) to (g) or (a) to (f).

Another subject of the invention is double layer-type energy storage systems such as ultracapacitors comprising a pair of electrodes of which at least one (and preferably both) is an electrode according to the invention as defined previously, an electronically non-conductive, porous and ion-conductive separator, and an electrolyte.

Suitable electrolytes for producing ultracapacitors consist of any highly ion-conductive medium such as an aqueous solution of an acid, a salt or a base. If desired, non-aqueous electrolytes may also be used such as tetraethylammonium tetrafluoroborate ($Et_4NBF_4$) in acetonitrile or γ-butyrolactone or propylene carbonate.

One of the electrodes may be composed of another material known in the art.

Between the electrodes is a separator, generally made of a material with high porosity, the role of which is to ensure an electronic insulation between the electrodes while letting the ions of the electrolyte pass through.

The process for manufacturing a film of active material, an electrode and the energy storage cell comprising 2 identical electrodes according to the invention are described in greater detail in the following examples. These examples are provided as an illustration and not a limitation of the invention.

EXAMPLES

In the examples, the electrodes are manufactured as follows:
ultrasonic mixing of 9 parts by weight of dried activated carbon, of 90.5 parts of ethanol at 70° C. for 15 minutes, then of 0.5 parts of a 60 wt % aqueous solution of PTFE;
partial evaporation of the solvent at 80° C. and kneading of the paste obtained in the presence of ethanol on an inert support (glass plate) until complete fibrillation of the PTFE;
drying of the paste under a rough vacuum at 100° C.; and
coating one face of two collectors made of aluminium foam (99.9% aluminium) previously laminated to 150 µm, mechanically etched with grade No. 180 sandpaper and covered with a polyurethane-based paint comprising 50 wt % of acetylene black, with the paste to form the electrode. The total thickness, after laminating, was 450 µm.

The systems were assembled in a glovebox in an atmosphere having a controlled content of water and oxygen (the contents of which were less than one ppm). Two square electrodes 4 $cm^2$ in area were taken and a separator made of a microporous polymer was inserted between them. The whole element was kept in place with 2 PTFE shims and 2 stainless steel clips. The element was then placed in a leaktight electrochemical cell containing, as the electrolyte, a 1.5 mol/l solution of tetraethylammonium tetrafluoroborate in acetonitrile.

In the examples, the protocol for measuring the electrochemical performances of the cells thus assembled was the following:
galvanostatic cycling: a constant current of ±5 $mA/cm^2$ between 0 and 2.3 V was imposed at the terminals of the capacitor, which allowed a charge-discharge curve to be established. The capacitance was deduced from the discharge slope of the capacitor and the capacitance was expressed per electrode and per gram of active material by multiplying this value by two then by dividing by the mass of active material per electrode. The resistance was measured by electrical impedance spectroscopy. This test consisted in subjecting the capacitor to a low-amplitude sinusoidal voltage of variable frequency around a stationary operating point. The response current was out of phase with the excitation voltage; the complex impedance was thus the ratio between the voltage and the intensity, similar to a resistance. The resistance was expressed by multiplying the real part of the impedance, for a frequency of 1 kHz, by the area of the electrode; and
ageing tests carried out in the following manner, ±50 $mA/cm^2$ galvanostatic cycling was carried out between 0 and 2.3 V. The capacitance was deduced directly from the discharge line of the ultracapacitor, and the resistance was measured at each end of charging by a series of 1 kHz current pulses. The measurements carried out at each cycle make it possible to monitor the change in the capacitance and in the resistance of the ultracapacitor as a function of the number of charge/discharge cycles. The cycling was carried out for a time that guaranteed the perfect sealing of the electrochemical cell, namely for a duration of 10 000 cycles.

Example 1

According to the Invention

An activated carbon was used that had the following characteristics:

| Porosity | | |
|---|---|---|
| BET surface area | $m^2/g$ | 1446 |
| microporous volume <2 nm | $cm^3/g$ | 0.598 |
| total volume | $cm^3/g$ | 0.768 |
| Particle size | | |
| $d_{50}$ | µm | 7.7 |
| $d_{90}$ | µm | 22.0 |
| pH | | 6 |
| purity: | | |
| total ashes | % | 0.9 |
| chromium | ppm | <5 |
| copper | ppm | 25 |
| iron | ppm | 280 |
| manganese | ppm | 10 |
| nickel | ppm | <5 |
| zinc | ppm | 5 |

The performances of the energy storage cells produced according to the procedure described above are given in the table below:

| Density of the electrode film (g/cm³) | Initial capacitance per unit vol. (F/cm³, measured at 5 mA/cm²) | Capacitance per unit vol. after 10 000 cycles/initial capacitance per unit vol. | Initial surface resistance (Ω·cm², measured at 1 kHz) | Surface resistance after 10 000 cycles/initial surface resistance |
|---|---|---|---|---|
| 0.56 | 52 | 0.9 | 0.8 | 1.2 |

Example 2

Two cells were produced that contained, instead of the activated carbon described in Example 1, and in the same proportions, an activated carbon sold by Kuraray under the name YP17 for one of then and an activated carbon sold by Norit under the name A SUPRA for the other one; the characteristics of these two commercial activated carbons are given below:

|  |  | YP17 | A SUPRA |
|---|---|---|---|
| Porosity |  |  | 4 |
| BET surface area | m²/g | 1686 | 1688 |
| microporous volume <2 nm | cm³/g | 0.691 | 0.745 |
| total volume | cm³/g | 0.889 | 1.172 |
| Particle size |  |  |  |
| $d_{50}$ | μm | 12.88 | 7.4 |
| $d_{90}$ | μm | 36.70 | 20.18 |
| pH |  | 5.7 | 6.8 |
| Purity: |  |  |  |
| total ashes | % | 0.6 | 2.1 |
| chromium | ppm | <5 | 30 |
| copper | ppm | 20 | 35 |
| iron | ppm | 100 | 220 |
| manganese | ppm | 5 | 5 |
| nickel | ppm | <5 | <5 |
| zinc | ppm | <5 | <10 |

The performances of the cells based on the YP17 and A SUPRA carbons are given in the table below:

|  | Density of the electrode film (g/cm³) | Initial capacitance per unit vol. (F/cm³, measured at 5 mA/cm²) | Capacitance per unit vol. after 8 000 cycles/initial capacitance per unit vol. | Initial resistance (Ω·cm², measured at 1 kHz) | Resistance after 8 000 cycles/initial resistance |
|---|---|---|---|---|---|
| YP17 | 0.45 | 46 | 0.9 | 0.8 | 1.5 |
| A SUPRA | 0.44 | 40 | 0.9 | 0.8 | 1.1 |

The comparison of the performances of the electrodes from Example 1 (according to the invention) and from Example 2 show that the electrode according to the invention results in an increase of 13 to 30% in the initial capacitance per unit volume and in the capacitance per unit volume after ageing, while retaining a very low resistance.

The invention claimed is:

1. Electrode comprising a current collector coated on one or two sides with an activated carbon (AC) film, wherein said AC film has the following characteristics:
   a) porosity:
      microporous volume (pore diameter <2 nm) determined by the DFT method between 0.5 cm³/g and 0.75 cm³/g, and representing at least 75 percent of the total porosity of said carbon:
      BET specific surface area between 1200 and 1800 m²/g;
   b) purity:
      total ash content, determined by the ASTM D2866-83 method less than 1.5% by weight;
      the weight percentages of the following impurities, determined by mineralization ($HNO_3/H_2O_2$ treatment) followed by analysis by ICP emission spectrometry or, for chlorides by extraction with water followed by analysis by ion chromatography, are such that:
      [chlorides]≦80 ppm:
      [chromium]≦20 ppm;
      [copper]≦50 ppm;
      [iron]≦300 ppm;
      [manganese]≦20 ppm;
      [nickel]≦10 ppm; and
      [zinc]≦20 ppm;
   c) particle size distribution, determined by laser scattering such that:
      3 μm≦$d_{50}$≦15 μm;
      10 μm≦$d_{90}$≦60 μm;
   d) pH, determined by the CEFIC method between 3.5 and 9,
   and at least one polymer material, having a thickness less than or equal to 1 mm;
   and wherein said electrode has the following characteristics in an organic electrolyte:
      electrode density or density of the film of active material of the electrode greater than or equal to 0.45 g/cm³, preferably greater than or equal to 0.5 g/cm³;
      initial capacitance per unit volume greater than or equal to 47, preferably greater than or equal to 50 F/cm³ of electrode, measured at 5 mA/cm²;
      ratio of the capacitance per unit volume after 10 000 cycles, measured at ±5 mA/cm² between 0 and 2.3 V, to the initial capacitance per unit volume that is greater than or equal to 0.85, preferably greater than or equal to 0.9;
      initial surface resistance of the cell (composed of 2 identical electrodes and a separator), measured at 1 kHz, less than or equal to 1, preferably less than or equal to 0.9, and advantageously less than or equal to 0.85 Ωcm²; and
      ratio of the surface resistance after 10 000 cycles to the initial resistance that is less than or equal to 1.5, preferably less than or equal to 1.3.

2. Process for preparing an electrode as defined in claim 1, wherein it comprises the following steps:
   (a) mixing a starting carbon-based pulverulent material comprising at least 80 and up to 97 parts by weight of AC and an aqueous or organic solvent, at a temperature of at least 50° C.;
   (b) addition of a polymer binder, in the form of an aqueous suspension or in solution in a solvent, chosen from thermoplastic polymers or elastomers or mixtures thereof that are soluble in a solvent, and mixing until homogenization;

(c) partial evaporation of the solvent, at a temperature preferably between 50 and 100° C., to obtain a paste or an ink or a slurry;
(d) optionally kneading the paste;
(e) forming the paste, ink or slurry into a thin film, or directly onto the current collector;
(f) drying the film, for example under a rough vacuum at a temperature of at least 80° C.; and
(g) covering one or two faces of a current collector with the film obtained in (f).

3. Process for preparing an electrode according to claim 2, wherein in step (a), up to 20 parts by weight of the AC or ACs may be replaced by one or more other carbon-based materials, chosen, from activated carbons, acetylene or carbon blacks, or carbon nanotubes.

4. Process for preparing an electrode according to claim 2, wherein in step (b) the polymer binder is either an aqueous suspension of PTFE or styrene/butadiene, or a solution of PVDF or VF2/HFP copolymer in acetone, N-methylpyrrolidone, and optionally in the presence of ethylene and/or propylene carbonate.

5. Process for preparing an electrode according to claim 2, wherein in step (b) the weight ratio of the carbon-based material to the polymer binder ranges from 99/1 to 70/30, preferably from 98/2 to 90/10.

6. Process for preparing an electrode according to claim 2, wherein the films of active carbon-based material and of polymer binder are produced by extrusion (steps (e) and (f)).

7. One or more electrodes of claim 2 comprising an energy storage system or ultracapacitor.

8. The process of claim 2 wherein it comprises the following steps:
(a) mixing a starting carbon-based pulverulent material comprising at least 80 and up to 97 parts by weight of AC and an aqueous or organic solvent, in the proportion of 3 to 50 parts by weight of solvent per 1 part of pulverulent material, at a temperature of from 50 to 80° C.;
(b) addition of a polymer binder, in the form of an aqueous suspension or in solution in a solvent, chosen from thermoplastic polymers or elastomers or mixtures thereof that are soluble in a solvent selected from the group consisting of, polyethers, polyoxyethylene (POE) and polyoxypropylene (POP), polyalcohols, polyvinyl alcohol (PVA), ethylene/vinyl acetate copolymers (EVA), polytetrafluoroethylene (PTFE), styrene/butadiene copolymers, polyvinylidene fluoride (PVDF) or PVDF/HFP-type copolymers, carboxymethyl cellulose (CMC) and polyimide, and mixing until homogenization;
(c) partial evaporation of the solvent, at a temperature preferably between 50 and 100° C., to obtain a paste or an ink or a slurry;
(d) optionally kneading the paste, until fibrillation of the binder;
(e) forming the paste, ink or slurry into a thin film, by coating onto a support, which is peelable, or directly onto the current collector;
(f) drying the film, for example under a rough vacuum at a temperature of at least 80° C.; and
(g) covering one or two faces of a current collector with the film obtained in (f).

9. The electrode of claim 1, wherein said activated carbon has the following characteristics:
a) porosity:
microporous volume (pore diameter <2 nm) determined by the DFT method between 0.5 cm$^3$/g and 0.65 cm$^3$/g, and representing at least 78 percent of the total porosity of said carbon;
BET specific surface area between 1200 and 1600 m$^2$/g;
d) pH, determined by the CEFIC method, between 4.5 and 8,
and at least one polymer material, having a thickness between 30 and 500 microns.

10. Process for preparing an electrode as defined in claim 1, wherein it comprises the following steps:
(a) mixing a starting carbon-based pulverulent material comprising at least 80 and up to 97 parts by weight of AC and an aqueous or organic solvent, preferably in the proportion of 3 to 50 parts by weight of solvent per 1 part of pulverulent material, preferably at a temperature of at least 50° C., for example from 50 to 80° C.;
(b) addition of a polymer binder, in the form of an aqueous suspension or in solution in a solvent, chosen from thermoplastic polymers or elastomers or mixtures thereof that are soluble in a solvent, for example polyethers, such as polyoxyethylene (POE) and polyoxypropylene (POP), polyalcohols such as polyvinyl alcohol (PVA), ethylene/vinyl acetate copolymers (EVA), polytetrafluoroethylene (PTFE), styrene/butadiene copolymers, polyvinylidene fluoride (PVDF) or PVDF/HFP-type copolymers, carboxymethyl cellulose (CMC) and polyimide, and mixing until homogenization;
(c) partial evaporation of the solvent, at a temperature preferably between 50 and 100° C., to obtain a paste or an ink or a slurry;
(d) optionally kneading the paste, preferably until fibrillation of the binder;
(e) forming the paste, ink or slurry into a thin film, for example by coating onto a support, which is preferably peelable, or directly onto the current collector;
(f) drying the film, for example under a rough vacuum at a temperature of at least 80° C.; and
(g) covering one or two faces of a current collector with the film obtained in (f).

\* \* \* \* \*